United States Patent
Kim et al.

(10) Patent No.: US 9,734,613 B2
(45) Date of Patent: Aug. 15, 2017

(54) APPARATUS AND METHOD FOR GENERATING FACIAL COMPOSITE IMAGE, RECORDING MEDIUM FOR PERFORMING THE METHOD

(71) Applicant: KOREA INSTITUTE OF SCIENCE AND TECHNOLOGY, Seoul (KR)

(72) Inventors: Ig Jae Kim, Seoul (KR); Young-ju Choi, Seoul (KR); Yu-Jin Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 36 days.

(21) Appl. No.: 14/863,772

(22) Filed: Sep. 24, 2015

(65) Prior Publication Data

US 2016/0104309 A1    Apr. 14, 2016

(30) Foreign Application Priority Data

Oct. 8, 2014 (KR) ........................ 10-2014-0135786

(51) Int. Cl.
*G06T 11/60* (2006.01)
*G06F 17/30* (2006.01)
(Continued)

(52) U.S. Cl.
CPC .......... *G06T 11/60* (2013.01); *G06F 17/3028* (2013.01); *G06K 9/00281* (2013.01);
(Continued)

(58) Field of Classification Search
CPC ......... G06T 11/60; G06T 17/20; G06K 9/481; G06K 9/66; G06K 9/00281; G06K 2009/00322; G06F 17/3028
(Continued)

(56) References Cited

U.S. PATENT DOCUMENTS 6,381,346 B1 *   4/2002   Eraslan .............. G06K 9/00221
                                                        345/420
6,661,906 B1 * 12/2003   Kawade ................. G06T 11/00
                                                        345/629
(Continued)

FOREIGN PATENT DOCUMENTS

KR        10-1339900 B1    12/2013
KR    10-2014-0043394 A     4/2014
(Continued)

OTHER PUBLICATIONS

Changsek Choi et al., "Computing Similarity between Montages and Facial Photos," Korean Institute of Information Scientists and Engineers, 2006, vol. 33, No. 2, pp. 453-458. (with English abstract).

(Continued)

*Primary Examiner* — Jon Chang
(74) *Attorney, Agent, or Firm* — NSIP Law

(57) ABSTRACT

Disclosed is an apparatus for generating a facial composite image, which includes: a database in which face image and partial feature image information is stored; a wireframe unit configured to apply a face wireframe to a basic face sketch image, the face wireframe applying an active weight to each intersecting point; a face composing unit configured to form a two-dimensional face model to which the wireframe is applied, by composing images selected from the database; and a model transforming unit configured to transform the two-dimensional face model according to a user input on the basis of the two-dimensional face model to which the wireframe is applied. Accordingly, a facial composite image with improved accuracy may be generated efficiently.

23 Claims, 12 Drawing Sheets

(51) Int. Cl.
    *G06K 9/00*     (2006.01)
    *G06K 9/66*     (2006.01)
    *G06T 17/20*     (2006.01)
    *G06T 3/40*     (2006.01)
    *G06K 9/48*     (2006.01)

(52) U.S. Cl.
    CPC .............. *G06K 9/481* (2013.01); *G06K 9/66* (2013.01); *G06T 17/20* (2013.01); *G06K 2009/00322* (2013.01)

(58) Field of Classification Search
    USPC ........................................................ 382/118
    See application file for complete search history.

(56) References Cited

U.S. PATENT DOCUMENTS

| | | | |
|---|---|---|---|
| 6,664,956 B1 * | 12/2003 | Erdem | .................... G06T 17/20 345/419 |
| 2013/0235033 A1 | 9/2013 | Kim et al. | |
| 2014/0129989 A1 | 5/2014 | Kim et al. | |

FOREIGN PATENT DOCUMENTS

| | | |
|---|---|---|
| KR | 10-2014-0059076 A | 5/2014 |
| WO | WO 2012/174491 A1 | 12/2012 |

OTHER PUBLICATIONS

Sungyeon Park et al., "Data-Driven Transformation of Facial Impression." Korea Computer Graphic Society Conference 2013, pp. 253-254. (with English abstract).

Youngju Choi et al., "System for creating a montage by total synthesis and partial combining." Korea Computer Graphic Society Conference 2013. (3 pages, with English abstract).

Charlie David Frowd, "EvoFIT: A Holistic, Evolutionary Facial Imaging System" Submitted for the degree of Doctor of Philosophy, Department of Psychology, University of Stirling, Apr. 2001, 251 pages.

* cited by examiner

SKETCH IMAGE    FACE WIREFRAME    FITTING RESULT

FIG. 10A

| SKIN TEXTURE | WRINKLE | FOREHEAD | |
| --- | --- | --- | --- |
| | | UNDER-EYE | |
| | | FURROW | |
| | SHADE | AROUND LIPS | |
| | | CHIN | |
| | INJURY | | |
| | TATTOO | | |
| | MOLE | | |

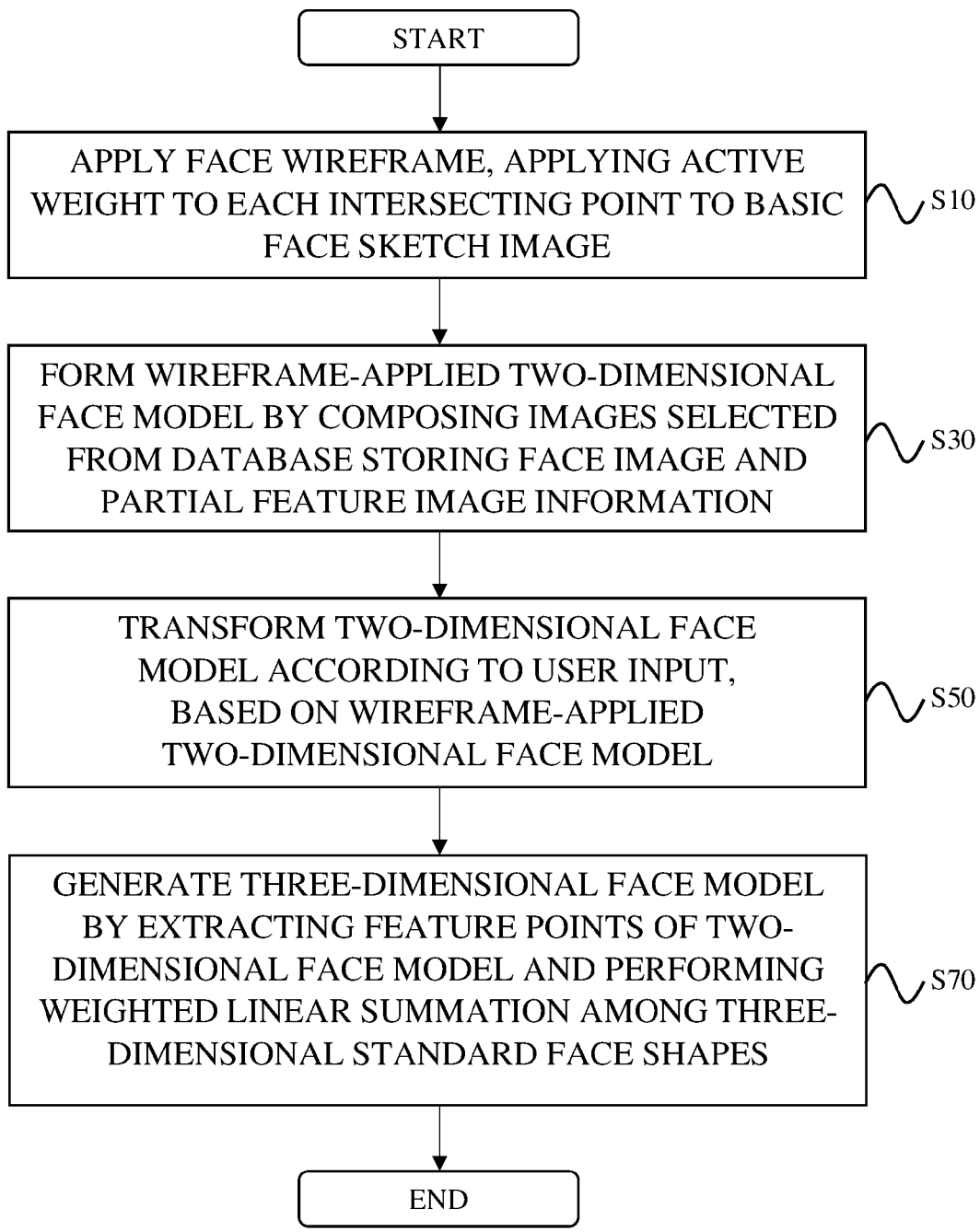

APPARATUS AND METHOD FOR GENERATING FACIAL COMPOSITE IMAGE, RECORDING MEDIUM FOR PERFORMING THE METHOD

CROSS-REFERENCE TO RELATED APPLICATION

This application claims priority to Korean Patent Application No. 10-2014-0135786, filed on Oct. 8, 2014, and all the benefits accruing therefrom under 35 U.S.C. §119, the contents of which in its entirety are herein incorporated by reference.

BACKGROUND

1. Field

The present disclosure relates to an intelligent integrated apparatus and method for generating a facial composite image, which supports enhancement and multi-functionality of a facial composite image system applied to criminal investigations, and a recording medium for performing the method.

2. Description of the Related Art

A montage is one of solutions for solving criminal events, and when making a montage, points similar to features of a suspect are found based on memory of witnesses who remember the face of the suspect, and an expected face image of the suspect is generated using various approaches.

A montage generating method may be generally classified into an overall composing method and a partial composing method. In the partial composing method, face information memorized by humans are regarded as fragmentary partial features. A montage system based on the partial composing method builds database for facial parts such as face contours, eyebrows, eyes, noses, mouths, ears, jaws or the like in advance and then generates a montage by selectively composing shapes of memorized parts from the database. This system is applied to, for example, a Korean montage program, used in the National Policy Agency of South Korea, as well as 'E-fit', 'Identikit', 'FACETTE', 'FACES', 'CD-FIT' or the like in other countries.

Meanwhile, the overall composing method is based on a psychological and cognitive science, based on the theory that a human recognizes a face in a holistic way, rather than in a piecemeal way. In this method, a montage is generated by combining whole face images, rather than partial face images. In other word, a witness selects face images most similar to his/her memory from given face images, and composes the selected face images in an evolutionary approach to obtain a desired montage finally. This method is applied to 'EFIT-V', 'EvoFit' or the like. It has been studied that the whole composing method allows faster generation of a montage in comparison to the partial composing method, and also gives better accuracy in comparison to the partial composing method.

However, in existing systems, a result obtained by composing may not be natural. In addition, existing systems are deficient in free modifications for delicately correcting a face image. For this reason, in practical use, an image generated by the montage system is frequently re-modified through a Photoshop program, which is cumbersome.

SUMMARY

The present disclosure is directed to providing an efficient and ungraded apparatus for generating a facial composite image.

The present disclosure is also directed to providing an efficient and ungraded method for generating a facial composite image.

The present disclosure is also directed to providing a recording medium on which a computer program for performing the efficient and ungraded method for generating a facial composite image is recorded.

In one aspect, there is provided an apparatus for generating a facial composite image, which includes: a database in which face image and partial feature image information is stored; a wireframe unit configured to apply a face wireframe to a basic face sketch image, the face wireframe applying an active weight to each intersecting point; a face composing unit configured to form a two-dimensional face model to which the wireframe is applied, by composing images selected from the database; and a model transforming unit configured to transform the two-dimensional face model according to a user input on the basis of the two-dimensional face model to which the wireframe is applied.

In an embodiment of the present disclosure, the model transforming unit may include a facial impression transforming unit configured to automatically transform an appearance of the two-dimensional face model according to a user selection.

In an embodiment of the present disclosure, the facial impression transforming unit may include: an appearance estimating unit configured to generate an appearance estimation function by using a front face image, appearance scores collected through user evaluation and feature vectors representing distances between feature points of a face shape as learning data; and a facial impression transformation output unit configured to transform an appearance of the two-dimensional face model by applying the appearance estimation function and output the transformed appearance.

In an embodiment of the present disclosure, the model transforming unit may include an age transforming unit configured to transform an age of the two-dimensional face model.

In an embodiment of the present disclosure, the age transforming unit may include: a global feature applying unit configured to perform an age transformation function by reflecting global feature information; a local feature applying unit configured to perform an age transformation function by reflecting local feature information; and an age transformation output configured to compose and output results of the global feature applying unit and the local feature applying unit.

In an embodiment of the present disclosure, the model transforming unit may include a free facial editing unit configured to transform a shape of the two-dimensional face model according to a user input.

In an embodiment of the present disclosure, the model transforming unit may include an image editing unit configured to give an editing function for the two-dimensional face model.

In an embodiment of the present disclosure, the model transforming unit may include a decorating unit configured to provide a decorating function for adding additional information to the two-dimensional face model.

In an embodiment of the present disclosure, the face composing unit may use a whole composing method in which crossover operations and mutation operations are repeatedly performed by using a face selected by a user as parent genes to approach a target face.

In an embodiment of the present disclosure, the face composing unit may use a partial composing method for composing a whole face by combining partial face portions.

In an embodiment of the present disclosure, the apparatus for generating a facial composite image may further include a three-dimensional model forming unit configured to generate a three-dimensional face model through weighted linear composition among three-dimensional standard face shapes by extracting feature points of the two-dimensional face model.

In an embodiment of the present disclosure, the three-dimensional model forming unit may provide at least one of an automatic facial expression control function, a free facial editing function, a background changing function and a decorating function.

In an embodiment of the present disclosure, the apparatus for generating a facial composite image may further include an output unit configured to output a final facial composite image.

In an embodiment of the present disclosure, the apparatus for generating a facial composite image may further include a face recognizing unit configured to select a most similar face from a criminal photograph database by recognizing the face of a final facial composite image.

In an embodiment of the present disclosure, the face recognizing unit may include: a photograph feature extracting unit configured to extract a local feature descriptor from the criminal photograph; a facial composite image feature extracting unit configured to extract a local feature descriptor from the final facial composite image; a projecting and feature learning unit configured to project the local feature descriptor of the photograph and the local feature descriptor of the facial composite image to the same space; and a comparison operating unit configured to compare a minimum distance between the local feature descriptor of the photograph and the local feature descriptor of the facial composite image.

In an embodiment of the present disclosure, the apparatus for generating a facial composite image may further include a database managing unit configured to perform maintenance of the database.

In an embodiment of the present disclosure, the apparatus for generating a facial composite image may further include a storing unit configured to provide a function of saving or loading a generated facial composite image.

In another aspect of the present disclosure, there is provided a method for generating a facial composite image, which includes: applying a face wireframe to a basic face sketch image, the face wireframe applying an active weight to each intersecting point; forming a two-dimensional face model to which the wireframe is applied, by composing images selected from a database in which face image and partial feature image information is stored; and transforming the two-dimensional face model according to a user input on the basis of the two-dimensional face model to which the wireframe is applied.

In an embodiment of the present disclosure, the transforming of the two-dimensional face model according to a user input may perform at least one of a facial impression transformation function, an age transformation function, a free facial editing function, an image editing function and a decorating function.

In an embodiment of the present disclosure, the forming of a two-dimensional face model may use a whole composing method or a partial composing method.

In an embodiment of the present disclosure, the method for generating a facial composite image may further include generating a three-dimensional face model through weighted linear composition among three-dimensional standard face shapes by extracting feature points of the two-dimensional face model.

In an embodiment of the present disclosure, the generating of a three-dimensional face model may perform at least one of an automatic facial expression control function, a free facial editing function, a background changing function and a decorating function.

In another aspect of the present disclosure, there is provided a computer-readable recording medium on which a computer program for performing the method for generating a facial composite image is recorded.

If the apparatus and method for generating a facial composite image and the recording medium for performing the method are used, a single integrated system is provided to cover functions variously demanded by a facial composite image system, and thus an efficient facial composite image system with enhanced composing result and shorten composing time is provided.

In particular, the facial composite image composing performance may be improved by upgrading the facial composite image system. Existing unnatural composing may be solved by changing the database and the texture composing method, and also a face image may be modified with the high degree of freedom by adding an elaborate face adjustment function based on a wireframe. In addition, a database selection method used for composing is changed to allow a more-efficient and faster approach to the database, and an age transformation function allows generation of reliable face images of various ages. Moreover, newly added functions improve accuracy of the facial composite image (similarity to an actual suspect), and also the facial composite image may be efficiently applied for criminal investigations.

BRIEF DESCRIPTION OF THE DRAWINGS

FIGS. 10A and 10B show examples of data items used for decorating.

FIG. 11 is a flowchart for illustrating a method for generating a facial composite image according to an embodiment of the present disclosure.

DETAILED DESCRIPTION

Figure 1:
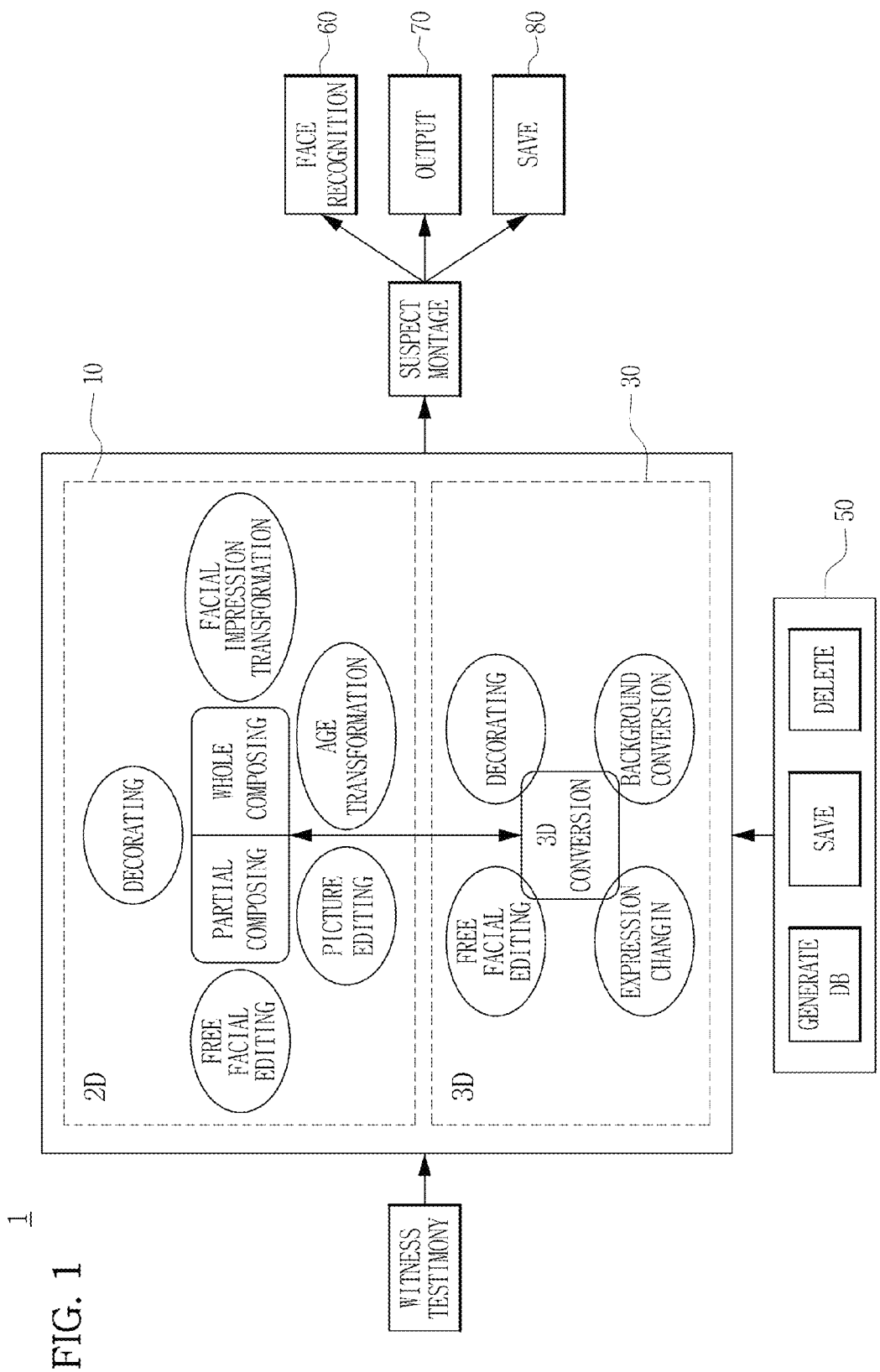
FIG. 1 is a schematic diagram showing an apparatus for generating a facial composite image according to an embodiment of the present disclosure.

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in detail with reference to the accompanying drawings.

Figure 2:
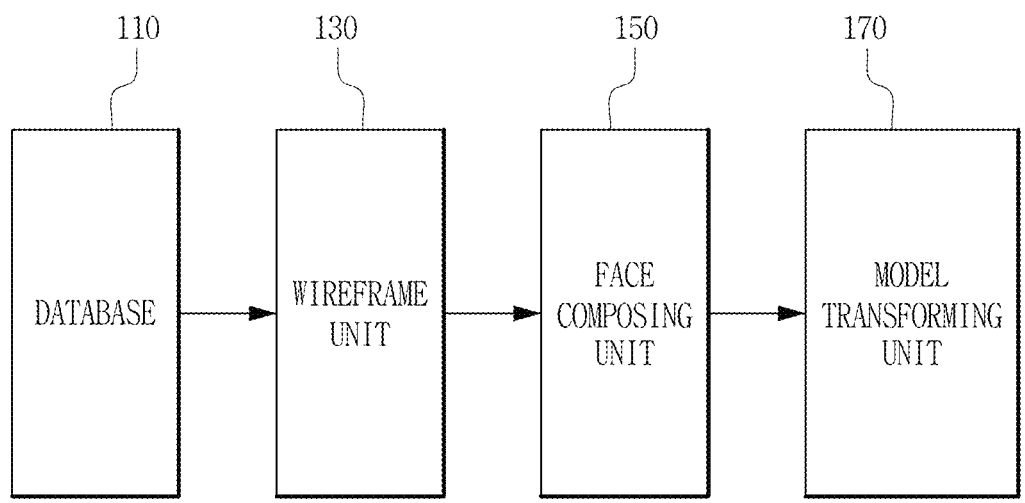
FIG. 2 is a block diagram showing a two-dimensional model forming unit depicted in FIG. 1.

FIG. 1 is a schematic diagram showing an apparatus for generating a facial composite image (hereinafter, also referred to as a facial composite image generating apparatus) according to an embodiment of the present disclosure. FIG. 2 is a block diagram showing a two-dimensional model forming unit depicted in FIG. 1.

Referring to FIG. 1, a facial composite image generating apparatus 1 according to the present disclosure includes a two-dimensional model forming unit 10 for composing an image to generate a two-dimensional facial composite image based on a testimony by witness and supporting a facial impression transformation function, an age transformation function, a picture editing function, a free facial editing function, a decorating function or the like. In addition, the facial composite image generating apparatus 1 may further include a three-dimensional model forming unit 30 for generating a three-dimensional face model based on the two-dimensional face model generated by the two-dimensional model forming unit 10 and may also further include at least one of a database managing unit 50, a face recognizing unit 60, an output unit 70 and a storing unit 80.

The facial composite image generating apparatus 1 allows wired/wireless communication and may be movable or fixed. The facial composite image generating apparatus 1 may be in the form of a server or engine, and may also be called with other terms such as a device, an apparatus, a terminal or the like.

Referring to FIG. 2, the two-dimensional model forming unit 10 includes a database 110, a wireframe unit 130, a face composing unit 150 and a model transforming unit 170.

The database 110 stores face image and partial feature image information. The database 10 may store data suitable for various races and nations. For example, when the facial composite image generating apparatus 1 is directed to investigating crimes in Korea, the data may be constructed based on Korean and may further include a small amount of foreigner data.

The wireframe unit 130 applies a face wireframe to a basic face sketch image, and the face wireframe applies an active weight to each intersecting point.

Figure 3:
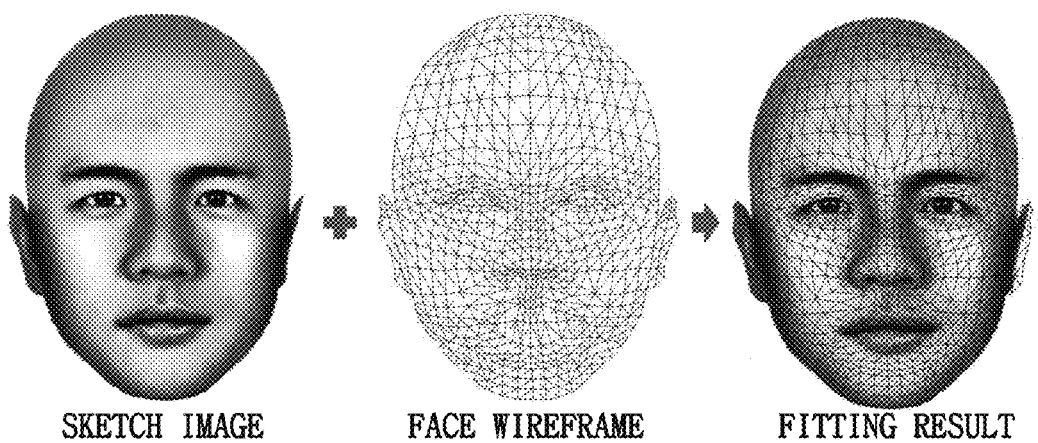
FIG. 3 is a schematic diagram for illustrating that a wireframe is applied by a wireframe unit depicted in FIG. 2.

FIG. 3 shows a structure of data used for generating a facial composite image.

Referring to FIG. 3, the data has a wireframe structure in which a basic face sketch image separated from the hair and a face image are shown. The basic face sketch image is free from hair, and if hair is placed in the same area with a face in a sketch, a composing result may be unnatural in whole composing or partial composing due to various kinds of hair styles. Therefore, the hair may be added through a decorating function after a facial composite image is generated.

The face wireframe may have a standard obj file format. By applying the wireframe, a user may select feature points to obtain a desired modification, and may also make a movement by selecting several points. An active weight is applied to each intersecting point of the face wireframe, and when feature points move, surrounding points move together with variable weights, thereby ensuring natural transformation.

The face composing unit 150 forms a two-dimensional face model to which the wireframe is applied, by composing images selected from the database 110. For this, the face composing unit 150 may use a whole composing method or a partial composing method, which may be used selectively or simultaneously.

In the whole composing method, crossover operations and mutation operations are repeatedly performed to a face selected by the user with parent genes according to an evolutionary algorithm to approach a target face. First, as a pre-process of the whole composing method, face image database according to appearances are classified into several appearance groups.

The on-line step is composed of two stages. A first stage is a group level convergence stage for estimating a face appearance group in which a criminal face is included. The system evenly selects candidate faces from the appearance group classified in the pre-process and shows the candidate faces to the witness as a candidate group, and the witness selects faces which look similar to the criminal face, from the candidate group. If this process is repeatedly performed, an appearance with highest reliability is determined from the appearance groups selected by the witness.

Figure 4:
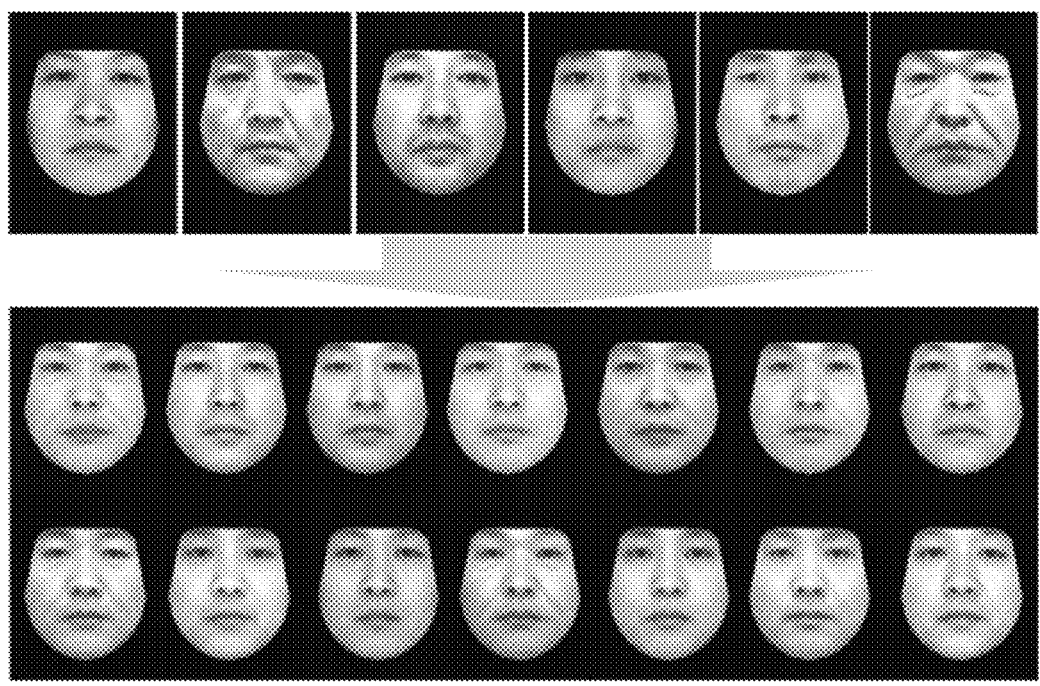
FIG. 4 shows examples of a child image produced by crossover operation from a parent image.

In a final stage, a facial composite image is generated through hybrid-type interactive evolutionary computation. In the interactive evolutionary computation, faces in the appearance group selected in the former stage are selected and shown to the witness as a candidate face group, and the witness selects faces similar to the criminal from the shown candidates. The selected faces are used as a single parent gene, and a crossover operation and a mutation operation are applied thereto to generate new faces of a filial generation, which are similar to the parent. The above process is repeated to approach a final target face. FIG. 4 shows an example of six parent images obtained by the whole composing method and child images produced through crossover operations.

However, if only the above process is performed, it is difficult to reflect face elements which are clearly memorized by the witness. Therefore, in the present disclosure, a partial composing method is applied so that specific face elements are arbitrarily set and combined. Accordingly, by repeatedly performing partial composing and interactive evolutionary computation, the face testified by the witness may be approached more rapidly.

In the partial composing method, face information is divided into several parts, and partial face elements are combined to generate a single face. The partial composing method compensates the whole composing method in which a memory for a specific portion cannot be used, and thus the partial composing method is suitable for a witness who memorizes a partial face portion.

Figure 5:
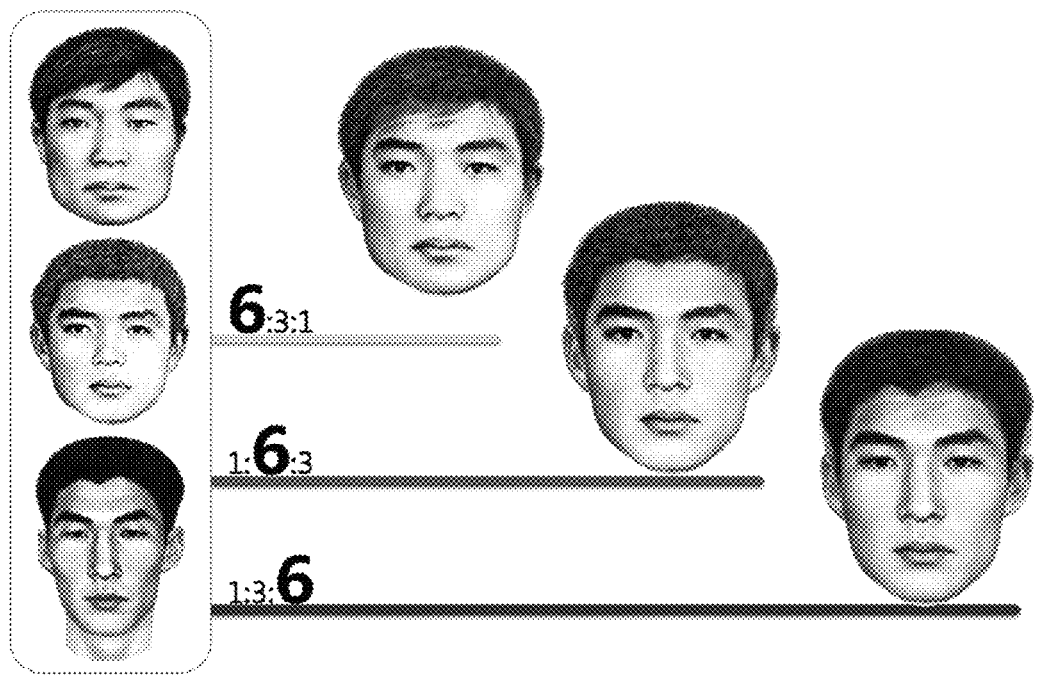
FIG. 5 shows examples of a face image generated according to various composing ratios.

Korean face sketch database used in the partial composing is grouped based on parts and shapes. The partial composing process is composed of two stages. The first stage is a face generating step. Referring to FIG. 5, faces most similar to a face shape testified by the witness are selected, and a desired face shape is generated while generating ratios among the selected faces.

Figure 6:
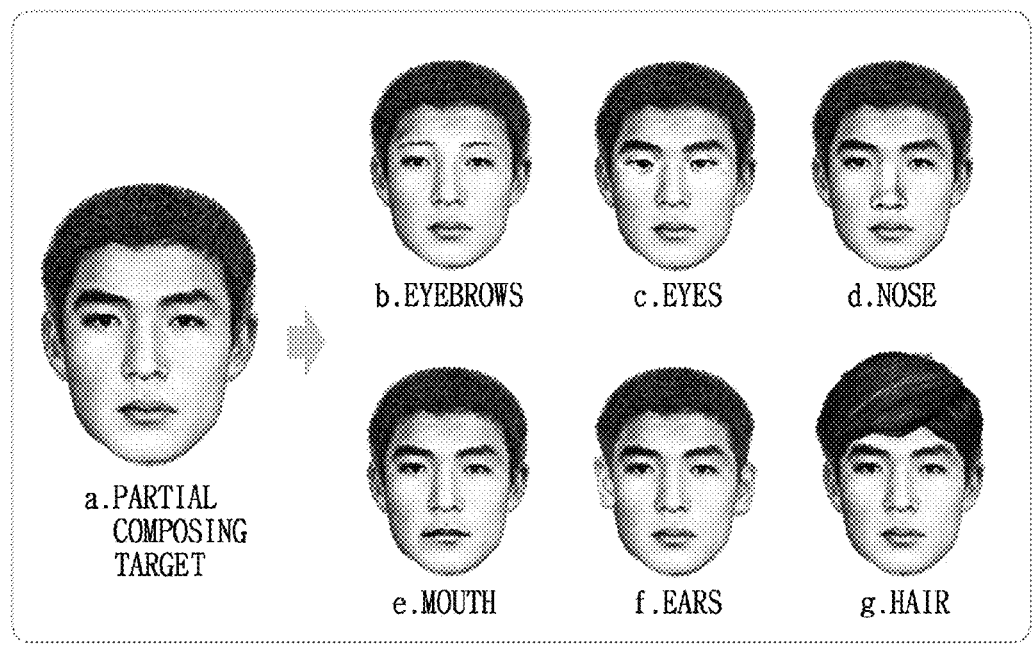
FIG. 6 shows examples of partially composed images.

In the next stage, the generated face shape is combined with a partial image. Referring to FIG. 6, a desired image is selected from the partial images classified depending on shapes as in the former stage and is composed with the face shape. For this composing process, the two-dimensional wireframe information representing the face structure information depicted as in FIG. 3 is applied, and the composing process is performed based thereon. Therefore, for actual composing, a shape is primarily composed according to a given composing ratio, and a texture is composed secondarily based on the composed shape information.

The model transforming unit 170 transforms the two-dimensional face model according to a user input based on the two-dimensional face model to which the wireframe is applied. For this, the model transforming unit 170 may provide and perform various functions and may also include various modules for such functions. In addition, these functions may be provided by a user interface.

Figure 7:
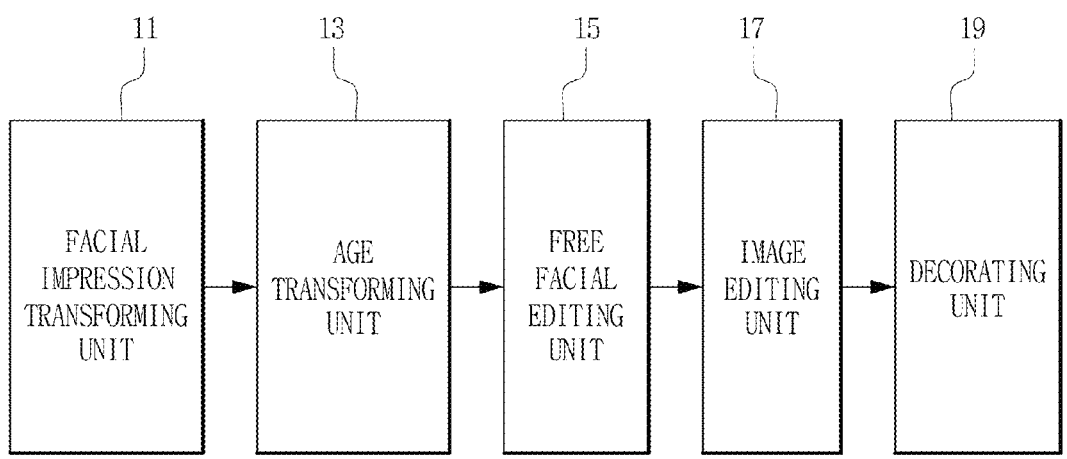
FIG. 7 is a block diagram showing a model transforming unit depicted in FIG. 2.

Referring to FIG. 7, the model transforming unit 170 may include a facial impression transforming unit 11, an age transforming unit 13, a free facial editing unit 15, an image editing unit 17 and a decorating unit 19. However, the model transforming unit 170 may integrate, divide, delete or add any module for performing each function.

The facial impression transforming unit 11 automatically transforms the two-dimensional face model into an appearance selected by the user. The facial impression transformation is a function for automatically transforming a face model into various appearances while keeping intrinsic identity of the target face by using an already-learned face database.

For this, the facial impression transforming unit 11 may include an appearance estimating unit for generating an appearance estimation function by using a front face image, appearance scores collected through user evaluation and feature vectors representing distances between feature points of a face shape as learning data, and a facial impression transformation output unit for transforming an appearance of the two-dimensional face model by applying the appearance estimation function and outputting the transformed appearance.

Figure 8:
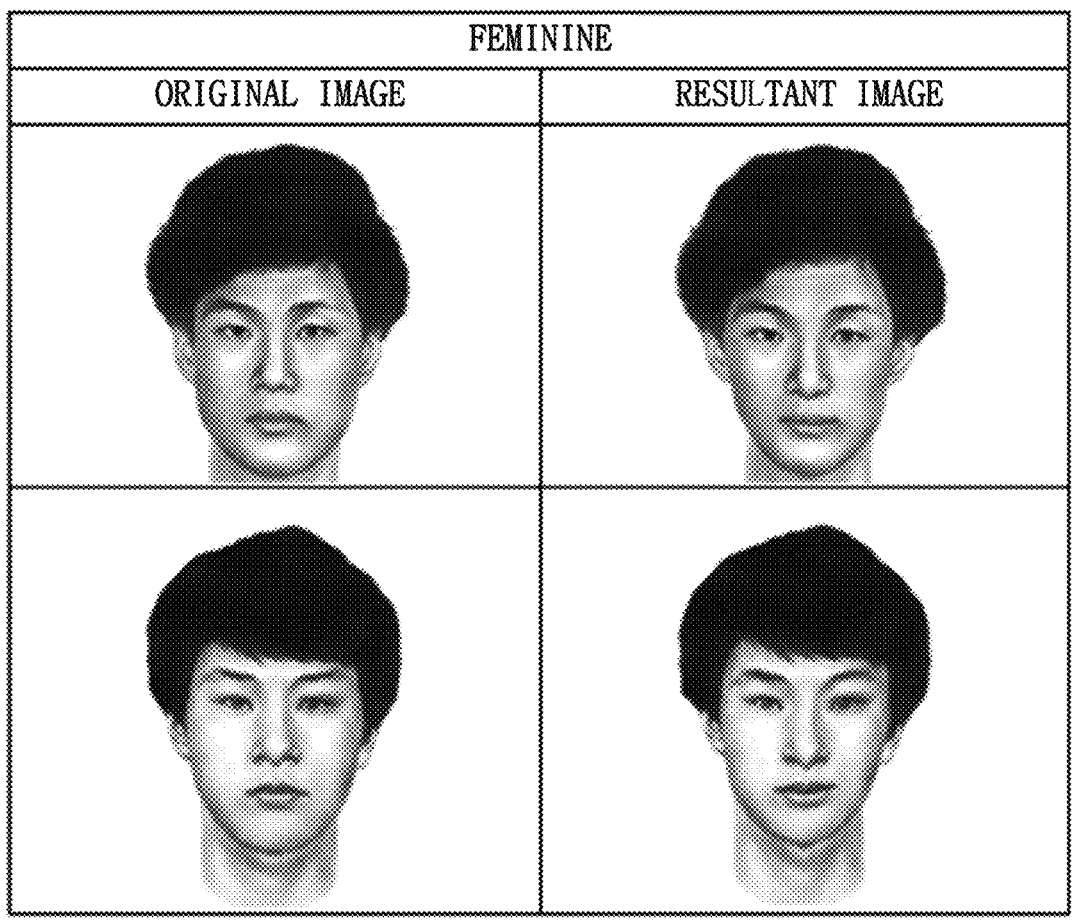
FIG. 8 shows examples where an appearance applied to a sketch is transformed.

The appearance score used as the learning data is collected through user evaluation with respect to a specific appearance (baby-faced, feminine, manly, menacing or the like), and the feature vector is composed of a distance between feature points representing a face shape. By using the built database group, an appearance score estimating function for a specific appearance is generated, and the input face is transformed into a face which is similar to the original face and has a high appearance score, by means of the estimation function. FIG. 8 shows a resultant image when the user selects 'feminine'.

Figure 9:
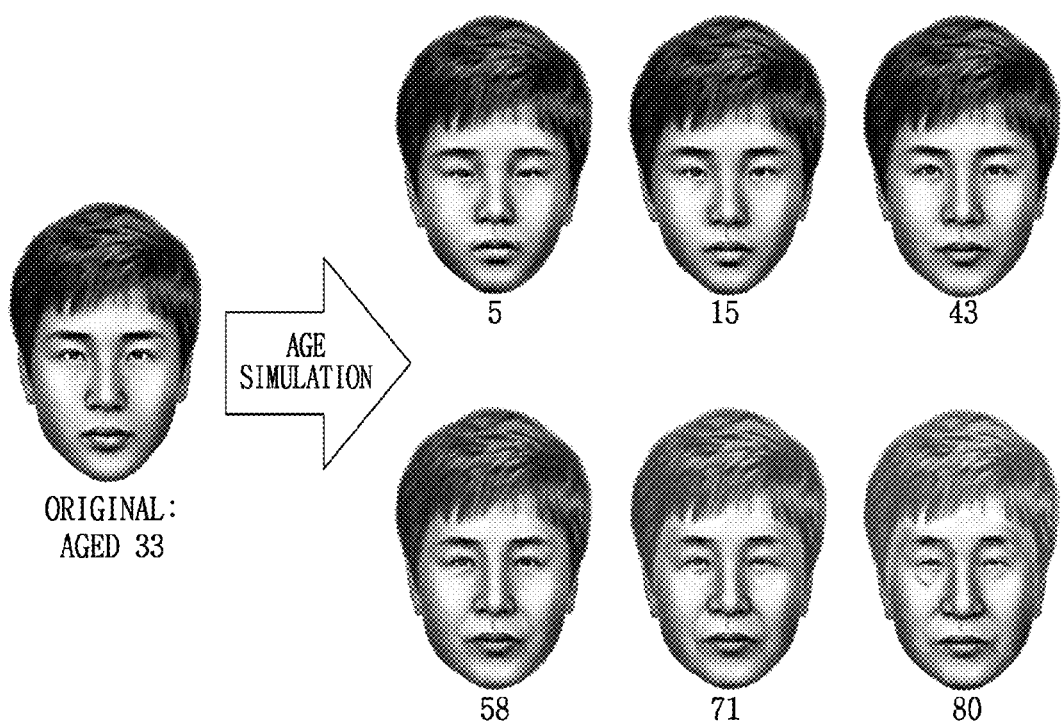
FIG. 9 shows examples where an age is transformed.

The age transforming unit 13 transforms an age of the two-dimensional face model. FIG. 9 shows an image after age transformation. The age transformation is performed by utilizing global and local feature information representing age information of the image. Main feature points of the face are extracted from the input image, and for example, local features such as wrinkle features and skin features and global features such as appearance features and shape parameters are extracted.

An age transformation function using the global feature information and an age transformation function using the local feature information are performed together based on the extracted information to generate a final target face.

For this, the age transforming unit 13 may include a global feature applying unit for performing an age transformation function reflecting the global feature information, a local feature applying unit for performing an age transformation function reflecting the local feature information, and an age transformation output unit for reconfiguring the two-dimensional face model by composing the results of the global feature applying unit and the local feature applying unit and outputting the reconfigured model.

In the existing technique, age transformation using a simple image effect shows serious difference from an actual image, which may give a reverse effect in finding a criminal. However, the present disclosure provides an age transformation system which ensures statistically satisfactory accuracy.

The free facial editing unit 15 transforms a shape of the two-dimensional face model according to a user input.

The facial composite image generating apparatus 1 according to the present disclosure has a wireframe-based sketch data structure as shown in FIG. 3. Therefore, when composing or transforming a face, framework information may be directly controlled to change a shape of the face image. In particular, an apex in the wireframe may be freely moved in an x-axial or y-axial direction for free conversion.

The image editing unit 17 provides an image-based editing function after a facial composite image is generated, thereby allowing delicate modification through a pose-process. For example, various functions may be provided as shown in Table 1 below.

TABLE 1

| Function | Function name | Detailed functions |
|---|---|---|
| Basic function | Image transformation | Image enlarging/reducing/moving/rotating |
| | Tool box | Color palette, pen selection tool, pattern selection tool, image information window |
| | Pen drawing | Pen drawing using brushes and patterns |
| | Line drawing | Line drawing using brushes and patterns |
| | Rectangle drawing | Rectangle drawing using brushes and patterns |
| | Circle drawing | Circle drawing using brushes and patterns |
| | Filling | Filling with the same tone |
| | File managing | Image file loading and saving |
| Special function | Magic tool | Area designation with a selected similar tone Provision of sensitivity and transparency adjusting options for a selected area |
| | Curve selection tool | Provision of color/chroma/blend adjusting functions for an area selected with a free curve |
| | Face enlarging | Enlarging only a face portion, instead of the entire image |
| | Quality enhancement | Application of a quality enhancing algorithm |
| | Image reversal | Image reversal in vertical and lateral directions |

TABLE 1-continued

| Function | Function name | Detailed functions |
|---|---|---|
| | Gaussian blur | Application of an entire image blur effect using Gaussian blur |
| | Spreading effect | Adjustment of a spreading effect to the entire image |
| | Sharpness effect | Application of a filter for enhancing sharpness of the entire image |

The decorating unit 19 may give additional information to a facial composite image by using various skin textures and accessories. Various face expressions may be available by using skin textures, and glasses or hats may be used to generate a facial composite image similar to an actual criminal.

Figure 10B:
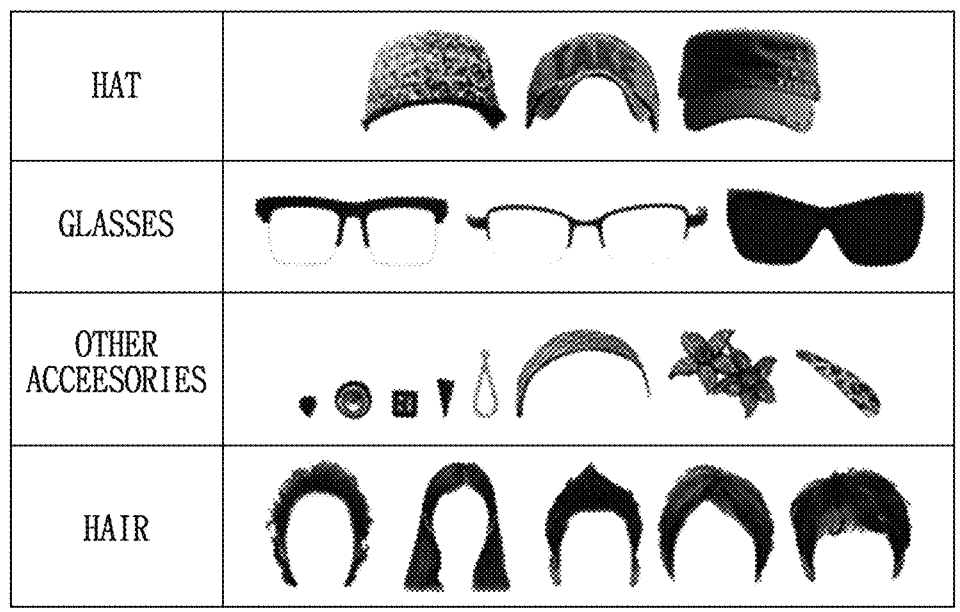

For example, the decorating unit 19 may use data depicted in each item of FIGS. 10A and 10B, and the data for decorating a face may be stored in the database 110.

As described above, the facial composite image generating apparatus 1 according to the present disclosure adopts the whole composing technique using appearance information, and thus it is possible to select and apply a suitable composing method according to the memory of a witness, even though partial features are combined in an existing system. In particular, as reported in several psychology studies, an appearance of a face may be memorized longer than feature points of the face, and it is known that when a facial composite image is produced, an appearance of a face is more likely to produce a face similar to a criminal. Based on the above theory, adding the whole composing technique may enhance the accuracy of a facial composite image, which may contribute to arrest of criminals, compared with the case where only the partial composing technique is applied.

In addition, when a produced facial composite image is cognitively inappropriate, the automatic facial impression transformation function allows the facial composite image to be compensatively corrected, thereby generating a facial composite image of a criminal which is more similar to an appearance memorized by the witness. The two-dimensional image editing function gives an editing function for various images, similar to Photoshop program. Even though a produced facial composite image has been reedited using another program for post-processing in the existing technique, in the present disclosure, an integrated apparatus for generating a facial composite image provides the two-dimensional image editing function, which gives convenience in making a facial composite image and allows producing a more delicate facial composite image in comparison to existing systems.

The three-dimensional model forming unit 30 extracts feature points of the two-dimensional face model produced by the two-dimensional model forming unit 10 and generates a three-dimensional face model through weighted linear composition among three-dimensional standard face shapes.

In detail, feature points for eye, nose, mouth and face contour are extracted from the input two-dimensional face image. Based on the extracted two-dimensional feature points, a three-dimensional face of a target image is generated through weighted linear composition among three-dimensional standard face shapes which represent Koreans. The three-dimensional face may be generated based on various Korean standard models, which allows generating a more Korean three-dimensional face.

A witness watches a face of a criminal not only in a front side but also in various directions. Therefore, the witness may memorize face at various angles better, rather than a front face. For this reason, if only a front face is composed, information memorized by the witness may not be properly utilized. In addition, a criminal face watched by the witness is not a two-dimensional sketch face but a face in a three-dimensional space. In this regard, surrounding light sources and backgrounds at that time are important factors in showing the face image of the criminal, which however has been neglected in an existing system. However, in the present disclosure, a three-dimensional face is generated and various at various time points are restored, thereby generating a facial composite image with reality.

The three-dimensional model forming unit 30 may give at least one of an automatic expression changing function, a free facial editing function, a background changing function and a decorating function. For performing such functions, the three-dimensional model forming unit 30 may include several modules independently or a single integrated module.

The automatic expression changing function sets various face expressions of a three-dimensional face model through adjustment within various value ranges, and manual works by dedicated animators may be handled easily. Here, expression information of three-dimensional standard models, constructed in advance, is shifted to the generated three-dimensional facial composite image model to automatically generate an expression model. Therefore, three-dimensional base sets with various expressions (joy, sorrow, angry, fright, smile or the like) are configured and linearly combined with an expressionless model with a suitable weight to make a desired expression. The prepared expression face source is applied to a target facial composite image three-dimensional model to generate a final target model with a changed expression.

The free facial editing function may adopt a feature point technique and a sketch technique. The feature point-based free facial editing is an editor of a three-dimensional model and allows setting feature points of each portion of the three-dimensional model and modifying a face model of each portion by freely modifying (rotating, moving, scaling or the like) the set points. The feature point is set to a location where face information is expressed best, and an easily-useable conversion function tool is provided to allow a maximum modification just with the set feature points.

The sketch-based free facial editing is an editing function for modifying a silhouette of a face by drawing a silhouette of the face to be edited and a corrected silhouette directly by the user when the three-dimensional model is modified. In particular, a face shape expressed with a silhouette may be delicately modified through a sketch-based modifying user interface, and also a maximum freedom is provided to the user in modifying a face model.

The background conversion function transforms a space where the three-dimensional model is shown, to give reliability to an image of the three-dimensional model and reproduce more diverse situations, which allows generating an image more similar to a target face. Background conversion items include adjustment of background light sources and colors, which give greatest influence on the image of the face. In addition, various rendering techniques are provided to adjust feeling of the whole image.

The decorating function allows decorating various styles by providing various accessories to the three-dimensional model. This is required for generating an image more similar to a target face, considering that an image of a face greatly varies depending on the style. Three-dimensional decorating items include glasses, hats, hair, accessories or the like. Each item may be suitably located at a target model by positioning or scaling using an editor tool.

The three-dimensional transformation function provided by the facial composite image generating apparatus 1 of the present disclosure automatically transforms a two-dimensional facial composite image into a three-dimensional image, which may overcome problems of a two-dimensional facial composite image, for example insufficient reliability, invariant viewing position, difficulty in considering surrounding environments or the like. In particular, since the free expression changing function, the face shape changing function and the decorating function are provided to the three-dimensional facial composite image, a face most similar to an appearance of the criminal, memorized by the witness, may be generated. Each function is provided through a UI which may be easily handled by the user, thereby giving easiness in making a facial composite image. In particular, the decorating function allows generating an appearance of a suspect with more reliability by using hair, skin textures, hats, mustaches, glasses, hoods, accessories or the like.

In addition, the facial composite image generating apparatus 1 according to the present disclosure may include modules for performing various functions.

The database managing unit 50 allows maintenance of the database and also facilitates building a database and continuously expanding data by generating, storing or deleting data.

The face recognizing unit 60 recognizes a final facial composite image and selects a most similar face from the criminal photograph database. A photograph and a facial composite image have different properties, and the features extracted therefrom cannot be compared with each other. Therefore, the features extracted therefrom are projected to the same space and compared with each other.

For this, the face recognizing unit 60 may include a photograph feature extracting unit for extracting a local feature descriptor from a photograph of the criminal, a facial composite image feature extracting unit for extracting a local feature descriptor from the final facial composite image, a projecting and feature learning unit for projecting the local feature descriptor of the photograph and the local feature descriptor of the facial composite image to the same space, and a comparison operating unit for comparing a minimum distance between the local feature descriptor of the photograph and the local feature descriptor of the facial composite image.

Generally, in criminal investigation, in order to arrest a criminal, an existing criminal database is analyzed. Therefore, the function of comparing the generated facial composite image with the actual criminal photograph database to find a similar face is an important factor for enhancing efficiency in criminal investigation.

The output unit 70 gives a print setting function for outputting the facial composite image in various sizes in order to distribute the facial composite image. The storing unit 80 may support so that the prepared facial composite image data may be stored and then loaded for reuse.

FIG. 11 is a flowchart for illustrating a method for generating a facial composite image according to an embodiment of the present disclosure.

The method for generating a facial composite image according to this embodiment may be performed with substantially the same configuration as the facial composite image generating apparatus 1 of FIG. 1. Therefore, a component identical to that of the facial composite image generating apparatus 1 of FIG. 1 is designated with the same reference symbol and is not described in detail here.

In other case, the method for generating a facial composite image according to this embodiment may be executed by software (or, application) for generating a facial composite image.

Referring to FIG. 11, in the method for generating a facial composite image according to this embodiment, a face wireframe applying an active weight to each intersecting point is applied to a basic face sketch image (S10).

When a facial composite image is generated, a user may select features for desired modification by applying the wireframe, and may also make a movement by selecting several points. An active weight is applied to each intersecting point of the face wireframe. Here, when the feature point moves, surrounding points move together with a variable weight, thereby ensuring natural modification.

Images selected from a database storing face image and partial feature image information are composed to form a two-dimensional face model to which the wireframe is applied (S30). The images may be composed by using a whole composing method or a partial composing method, and these composing methods may be used selectively or simultaneously.

Based on the two-dimensional face model to which the wireframe is applied, the two-dimensional face model is transformed according to a user input (S50). In order to transform the two-dimensional face model, at least one of a facial impression transformation function, an age transformation function, a free facial editing function, an image editing function and a decorating function is provided, and the two-dimensional face model may be transformed according to a user input.

In addition, feature points of the two-dimensional face model may be selectively extracted to generate a three-dimensional face model through weighted linear composition among three-dimensional standard face shapes (S70). After three-dimensional face model is generated, at least one of an automatic expression changing function, a free facial editing function, a background changing function and a decorating function is provided, and the three-dimensional face model may be transformed according to a user input.

In addition, various functions such as printing, face recognition, database building, data saving and data loading may be provided, and a UI for the functions may be provided.

The method for generating a facial composite image according to this embodiment upgrades existing systems by analyzing merits and demerits of the existing facial composite image systems, and newly demanded functions are added through user analysis.

In detail, existing facial composite image systems are upgraded by means of 1) change of the DB (change in a face sketching method, change of a face shape information structure), 2) change of the texture composing method, 3) change of the DB selection structure (in view of UI and DB building), 4) fine face control (adjustment of the wireframe), 5) the age transformation function for ensuring accuracy through performance evaluation. In addition, there are added 1) a face generating function by means of an evolutionary approach using user appearance information (global), 2) a facial impression transformation function, 3) a facial composite image recognition function, 4) a two-dimensional image editing function, and 5) a transformation function for transforming a two-dimensional sketch face into a three-dimensional image as well as a free facial editing function and a decorating function on the three-dimensional image.

The method for generating a facial composite image as described above may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a compiler but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims.

The present disclosure may improve facial composite image composing performance by upgrading a facial composite image system and also improve accuracy of a facial composite image (similarity to an actual suspect) through newly added functions. Therefore, the facial composite image may be more efficiently applied for criminal investigations.

What is claimed is:

1. An apparatus for generating a facial composite image, comprising:
   a database to store face image and partial feature image information;
   a wireframe applicator configured to apply a face wireframe to a basic face sketch image based on applying an active weight to each intersecting point of the face wireframe;
   a face composer configured to form a two-dimensional face model to which the face wireframe is applied, by repeated performing crossover operations and mutation operations using a face selected from the database as parent genes to approach a target face; and
   a model transformer configured to transform the two-dimensional face model to which the wireframe is applied according to a user input.

2. The apparatus for generating a facial composite image according to claim 1, wherein the model transformer comprises a facial impression transformer configured to automatically transform an appearance of the two-dimensional face model according to a user selection.

3. The apparatus for generating a facial composite image according to claim 2, wherein the facial impression transformer comprises:
   an appearance estimator configured to generate an appearance estimation function by using a front face image, appearance scores collected through user evaluation and feature vectors representing distances between feature points of a face shape as learning data; and
   a facial impression transformation output configured to transform an appearance of the two-dimensional face model by applying the appearance estimation function and configured to output the transformed appearance.

4. The apparatus for generating a facial composite image according to claim 1, wherein the model transformer comprises an age transformer configured to transform an age of the two-dimensional face model.

5. The apparatus for generating a facial composite image according to claim 4, wherein the age transformer comprises:
   a global feature applicator configured to perform an age transformation function by applying global feature information;
   a local feature applicator configured to perform an age transformation function by applying local feature information; and
   an age transformation output configured to compose and output results of the global feature applicator and the local feature applicator.

6. The apparatus for generating a facial composite image according to claim 1, wherein the model transformer comprises a free facial editor configured to transform a shape of the two-dimensional face model according to a user input.

7. The apparatus for generating a facial composite image according to claim 1, wherein the model transformer comprises an image editor configured to provide an editing function for the two-dimensional face model.

8. The apparatus for generating a facial composite image according to claim 1, wherein the model transformer comprises a decorator configured to provide a decorating function for adding additional information to the two-dimensional face model.

9. The apparatus for generating a facial composite image according to claim 1, wherein the face composer is further configured to use a partial composing method for composing a whole face by combining partial face portions.

10. The apparatus for generating a facial composite image according to claim 1, further comprising:
    a three-dimensional modeler configured to generate a three-dimensional face model through weighted linear composition among three-dimensional standard face shapes by extracting feature points of the two-dimensional face model.

11. The apparatus for generating a facial composite image according to claim 10, wherein the three-dimensional modeler provides at least one of an automatic facial expression control function, a free facial editing function, a background changing function or a decorating function.

12. The apparatus for generating a facial composite image according to claim 1, further comprising:
    an output configured to output a final facial composite image.

13. The apparatus for generating a facial composite image according to claim 1, further comprising:
    a face recognizer configured to select a most similar face from a criminal photograph stored in a criminal photograph database by recognizing the face of a final facial composite image.

14. The apparatus for generating a facial composite image according to claim 13, wherein the face recognizer comprises:
- a photograph feature extractor configured to extract a local feature descriptor from the criminal photograph;
- a facial composite image feature extractor configured to extract a local feature descriptor from the final facial composite image;
- a projecting and feature learner configured to project the local feature descriptor of the photograph and the local feature descriptor of the facial composite image to the same space; and
- a comparison operator configured to compare a minimum distance between the local feature descriptor of the photograph and the local feature descriptor of the facial composite image.

15. The apparatus for generating a facial composite image according to claim 1, further comprising:
- a database manager configured to maintain the database.

16. The apparatus for generating a facial composite image according to claim 1, further comprising:
- a memory configured to store a generated facial composite image.

17. A method for generating a facial composite image, comprising:
- applying a face wireframe to a basic face sketch image based on applying an active weight to each intersecting point of the face wireframe;
- forming a two-dimensional face model to which the face wireframe is applied, by repeatedly performing crossover operations and mutation operations using a face selected from a database in which face image and partial feature image information is stored, as parent genes to approach a target face; and
- transforming the two-dimensional face model to which the face wireframe is applied according to a user input.

18. The method for generating a facial composite image according to claim 17, wherein the transforming of the two-dimensional face model according to a user input performs at least one of a facial impression transformation function, an age transformation function, a free facial editing function, an image editing function or a decorating function.

19. The method for generating a facial composite image according to claim 17, wherein the forming of the two-dimensional face model further comprises using a partial composing method.

20. The method for generating a facial composite image according to claim 17, further comprising:
- generating a three-dimensional face model through weighted linear composition among three-dimensional standard face shapes by extracting feature points of the two-dimensional face model.

21. The method for generating a facial composite image according to claim 20, wherein the generating of a three-dimensional face model performs at least one of an automatic facial expression control function, a free facial editing function, a background changing function or a decorating function.

22. A non-transitory computer-readable medium storing instructions that, when executed by a processor, cause the processor to perform the method of claim 17.

23. An apparatus for generating a facial composite image, comprising:
- a database to store face image and partial feature image information;
- a wireframe applicator configured to apply a face wireframe to a basic face sketch image based on applying an active weight to each intersecting point of the face wireframe;
- a face composer configured to form a two-dimensional face model to which the face wireframe is applied, by composing images selected from the database; and
- a model transformer configured to transform the two-dimensional face model to which the wireframe is applied according to a user input,
- wherein the model transformer comprises an age transformer configured to transform an age of the two-dimensional face model, the age transformer comprising:
  - a global feature applicator configured to perform an age transformation function by applying global feature information;
  - a local feature applicator configured to perform an age transformation function by applying local feature information; and
  - an age transformation output configured to compose and output results of the global feature applicator and the local feature applicator.

\* \* \* \* \*